United States Patent
Iwahara

(10) Patent No.: US 7,609,484 B2
(45) Date of Patent: Oct. 27, 2009

(54) MAGNETIC DISK DEVICE

(75) Inventor: Hiroyuki Iwahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 327 days.

(21) Appl. No.: 11/255,977

(22) Filed: Oct. 24, 2005

(65) Prior Publication Data
US 2007/0025024 A1   Feb. 1, 2007

(30) Foreign Application Priority Data
Jul. 28, 2005   (JP)   ............... 2005-219109

(51) Int. Cl.
*G11B 21/02* (2006.01)
*G11B 33/12* (2006.01)
*G11B 33/14* (2006.01)
(52) U.S. Cl. .................................. 360/264.8
(58) Field of Classification Search ............ 360/264.8, 360/264.9, 265.1
See application file for complete search history.

(56) References Cited

U.S. PATENT DOCUMENTS 6,661,603 B1 * 12/2003 Watkins et al. ........... 360/97.01
6,735,054 B2 * 5/2004 Ooi et al. ................. 360/264.9
7,274,119 B2 * 9/2007 Ogawa ......................... 310/12
7,289,301 B2 * 10/2007 Kim et al. ................ 360/264.7
2003/0002223 A1 * 1/2003 Misso et al. ............. 360/265.1

FOREIGN PATENT DOCUMENTS

| JP | 5-21398 | 3/1993 |
| JP | 07169212 A | * 7/1995 |
| JP | 2004164738 A | * 6/2004 |
| JP | 2004-296011 | 10/2004 |

* cited by examiner

*Primary Examiner*—William J Klimowicz
(74) *Attorney, Agent, or Firm*—Kratz, Quintos & Hanson, LLP

(57) ABSTRACT

In a magnetic disk device, a magnetic circuit drives an actuator carrying a magnetic head, so that the magnetic head is moved to a target track on a surface of a magnetic disk. A base has a threaded-hole part to which the magnetic circuit is fastened with a screw. A blocking member is provided to enclose a gap which is formed between the magnetic circuit and the threaded-hole part when the magnetic circuit is fastened to the threaded-hole part.

7 Claims, 8 Drawing Sheets

MAGNETIC DISK DEVICE

CROSS-REFERENCE TO RELATED APPLICATION

This application is based upon and claims the benefit of priority of Japanese Patent Application No. 2005-219109, filed on Jul. 28, 2005, the entire contents of which are herein incorporated by reference.

BACKGROUND OF THE INVENTION

1. Field of the Invention

The present invention generally relates to a magnetic disk device, and more particularly to a magnetic disk device which performs recording/reproducing processing to a magnetic disk by driving an actuator on which a magnetic head is provided, by using a magnetic circuit attached to a base.

2. Description of the Related Art

FIG. 1 through FIG. 4 are diagrams for explaining the composition of a conventional magnetic head device 100.

FIG. 1 is a perspective view showing the conventional magnetic disk device 100, and FIG. 2 is a cross-sectional view of the magnetic disk device 100 taken along the line X1-X1 indicated in FIG. 1. FIG. 3 is a perspective view showing the mounting structure of a magnetic circuit 150 (described later) in the magnetic disk device 100, and FIG. 4 is an enlarged cross-sectional view showing the neighborhood portion of a screw 126 in the state where the magnetic circuit 150 is fixed to the base 113.

As shown in FIG. 1 through FIG. 4, the actuator 122 supports the head slider 114 on which a magnetic head is mounted, and the actuator 122 is supported on the shaft 140 such that the actuator 122 can be swung around the shaft 140. The voice coil 151 is mounted at the rear-end part of the actuator 122 behind the shaft 140.

The voice coil 151 is driven by the magnetic circuit 150 so that the actuator 122 is swung around the center of the shaft 140.

The magnetic circuit 150 is constituted by the upper yoke 153A, the lower yoke 153B, the upper magnet 155A, and the lower magnet 155B. As shown in FIG. 2 and FIG. 3, the upper magnet 155A is disposed on the bottom surface of the upper yoke 153A, and the lower Magnet 155B is disposed on the top surface of the lower yoke 153B.

A gap is formed between the upper magnet 155A and the lower magnet 155B, and the voice coil 151 of the actuator 122 is movably disposed in this gap.

The voice coil 151, the upper yoke 153A, the lower yoke 153B, the upper magnet 155A, and the lower magnet 155B constitute the voice coil motor 123 (VCM). This voice coil motor 123 serves as a source of a drive which swings the actuator 122 around the center of the shaft 140.

In the following explanation, it is supposed that the upper and lower yokes 153A and 153B and the upper and lower magnets 155A and 155B, excluding the voice coil 151, among the components of the voice coil motor 123, constitute a magnet circuit 150, and these are called the components of the magnetic circuit 150.

In the magnetic disk device 100, it is necessary to position the head slider 114 (magnetic head) at a given location on the magnetic disk 101 with high precision, in order to perform proper magnetic recording/reproducing processing.

For this reason, the actuator 122 and the shaft 140 which supports the actuator 122 are disposed on the base 113 with high precision. Under the present circumstances, in order to keep an appropriate state of the head slider 114 (magnetic head) and the magnetic disk 101 at the time of recording/reproducing, accurate positioning of the actuator 122 and the shaft 140 in the height direction on the base 113 is important.

Moreover, the voice coil 151 of the actuator 122 which is disposed with high precision is inserted in the magnetic circuit 150, and it is also necessary to raise the accuracy of positioning of the magnetic circuit 150 in the height direction on the base 113.

For this reason, as shown in FIG. 3, a reference-height projection 124 is formed in the bottom plate 113A of the base 113, and the magnetic circuit 150 is placed on this reference-height projection 124, so that the height arrangement of the magnetic circuit 150 on the base 113 is thereby determined.

The reference-height projection 124 is formed with high precision, and placing the magnetic circuit 150 on the reference-height projection 124 enables good height accuracy to be attained.

Moreover, the magnetic circuit 150 is provide with washer parts 150, and each washer part 150 has a through hole which passes through the screw 126 being inserted. Therefore, the magnetic circuit 150 is fixed to the base 113 by inserting the screws 126 in the through holes of the washer parts 156 and fastening them to the threaded-hole parts 125.

Moreover, the magnetic circuit 150 is provided with washer parts 156, and each washer part 156 has a through hole which passes through the screw 126 being inserted. Therefore, the magnetic circuit 150 is fixed to the base 113 by inserting the screws 126 in the through holes of the washer parts 156 and fastening them to the threaded-hole parts 125.

As described above, if the height accuracy of the actuator 122 and the magnetic circuit 150 on the base 113 is kept good, it is possible to maintain an appropriate state of the head slider 114 (magnetic head) and the magnetic disk 101 at the time of recording/reproducing.

In order to maintain an appropriate state of the head slider 114 (magnetic head) and the magnetic disk 101, it is necessary to ensure that dust (contamination) may not enter the magnetic disk device 100. If dust enters the space between the magnetic disk 101 and the head slider 114, there is a possibility that the magnetic surface formed in the surface of the magnetic disk 101, and the sliding-contact surface of the magnetic head may be damaged (head crash).

To obviate the problem, various countermeasures for preventing occurrence of dust have been proposed conventionally. For example, see Japanese Laid-Open Patent Application No. 2004-296011.

By the way, when the mounting structure in which the magnetic circuit 150 is placed on the reference-height projection 124 is used to raise the height accuracy of the mounting structure as mentioned above, it is difficult to firmly fix the magnetic circuit 150 to the threaded-hole parts 125. In other words, if the magnetic circuit 150 is firmly fixed to the threaded-hole parts 125, the reference-height projection 124 is crushed and the height accuracy will deteriorate.

For this reason, it is necessary to provide a design gap between the upper surface of the threaded-hole part 125 and the washer part 156 in the state where the magnetic circuit 150 is attached to the base 113 as shown in FIG. 4. In FIG. 4, ΔH indicates this gap.

However, because of the use of the gap ΔH, there is a possibility that the threaded-hole part 125 remains exposed to the inside of the magnetic disk device, which causes occurrence of dust (contamination).

When the screws 126 are fastened to the threaded-hole parts 125, or when the screws 126 are removed from the threaded-hole parts 125, a possibility that dust from the threaded-hole parts 125 may be scattered inside the magnetic disk device 100 becomes high. Thus, if dust (contamination) from the threaded-hole parts 125 is scattered inside the magnetic disk device 100, such dust may cause a head crash to take place as described above.

SUMMARY OF THE INVENTION

An object of the present invention is to provide an improved magnetic disk device in which the above-mentioned problems are eliminated.

Another object of the present invention is to provide a magnetic disk device which is capable of preventing the dust from being scattered inside the magnetic disk device, even when a gap is provided between the upper surface of the threaded-hole part and the washer part in the state where the magnetic circuit is attached to the base.

In order to achieve the above-mentioned objects, the present invention provides a magnetic disk device comprising: a magnetic circuit driving an actuator carrying a magnetic head, so that the magnetic head is moved to a target track on a surface of a magnetic disk; a base having a threaded-hole part to which the magnetic circuit is fastened with a screw; and a blocking member provided to enclose a gap which is formed between the magnetic circuit and the threaded-hole part when the magnetic circuit is fastened to the threaded-hole part.

According to the above-mentioned magnetic disk device of the invention, the gap formed between the magnetic circuit and the threaded-hole part is enclosed by the blocking member, and even if dust occurs from the threaded-hole part when the magnetic circuit is fastened to the threaded-hole part, such dust does not leak out of the exterior of the blocking member. Therefore, the dust from the threaded-hole part does not adhere to the space between the magnetic head and the magnetic disk, and it is possible to increase the reliability of the magnetic disk device.

Moreover, the above-mentioned magnetic disk device may be configured so that the blocking member is a tubular member which is made of an elastic material.

According to the above-mentioned magnetic disk device of the invention, the blocking member is the tubular member which is made of the elastic material, and the tubular member made of the elastic material as the blocking member can be easily obtained and it is possible to attain low-cost production of the blocking member.

Moreover, the above-mentioned magnetic disk device may be configured so that the tubular member comprises a fixed portion fixed onto the threaded-hole parts and a projecting portion upwardly projecting from the threaded-hole part and contacting the magnetic circuit with an elastic deformation.

According to the above-mentioned magnetic disk device of the invention, the tubular member comprises the fixed portion and the projecting portion. The fixed portion of the tubular member is fixed onto the threaded-hole part, and the attaching characteristic of the blocking member to the threaded-hole part can be increased. And the projecting portion of the tubular member upwardly projects from the threaded-hole part and contacts the magnetic circuit with an elastic deformation. The adhesion of the blocking member to the magnetic circuit becomes appropriate, and it is possible to prevent more certainly the leakage of dust out of the exterior of the blocking member.

Moreover, the above-mentioned magnetic disk device may be configured so that a reference-height projection is formed on the base, and the magnetic circuit is placed on the reference-height projection so that positioning of the magnetic circuit in a height direction on a bottom plate of the base is performed.

According to the above-mentioned magnetic disk device of the invention, the reference-height projection is provided on the base, and the magnetic circuit is placed on the reference-height projection so that positioning of the magnetic circuit in the height direction on the bottom plate of the base is performed.

In this composition, it is inevitably necessary to form a gap between the threaded-hole part and the magnetic circuit, in order to raise the accuracy of the positioning in the height direction. However, this gap is enclosed by the blocking member, and it is possible to prevent the leakage of dust while the accuracy of the positioning is maintaining at a high level.

Moreover, the above-mentioned magnetic disk device may be configured so that the threaded-hole part is arranged in a column formation which projects from the bottom plate of the base. According to the above-mentioned magnetic disk device of the invention, the blocking member can be easily attached to the threaded-hole part.

Moreover, the above-mentioned magnetic disk device may be configured so that the tubular member is made of an elastic material which is either a rubber or a resin. The elastic material, such as a rubber or a resin, is inexpensive and very stable, and it is possible to increase the adhesion of the blocking member to the magnetic circuit.

Moreover, the above-mentioned magnetic disk device may be configured so that the blocking member is a packing member which is made of an elastic material. The elastic material, such as a rubber or a resin, is inexpensive and very stable, and it is possible to attain low-cost production of the blocking member.

According to the above-mentioned invention, it is possible to prevent the dust from the threaded-hole part from being scattered inside the magnetic disk device. Thus, there is no possibility that the dust from the threaded-hole part adheres to the space between the magnetic head and the magnetic disk, and it is possible to increase the reliability of the magnetic disk device.

BRIEF DESCRIPTION OF THE DRAWINGS

Other objects, features and advantages of the present invention will be apparent from the following detailed description when read in conjunction with the accompanying drawings.

DETAILED DESCRIPTION OF PREFERRED EMBODIMENTS

A description will now be given of a preferred embodiment of the invention with reference to the accompanying drawings.

FIG. 5 through FIG. 8 are diagrams for explaining the composition of a magnetic disk device 10 in an embodiment of the invention.

Figure 1:
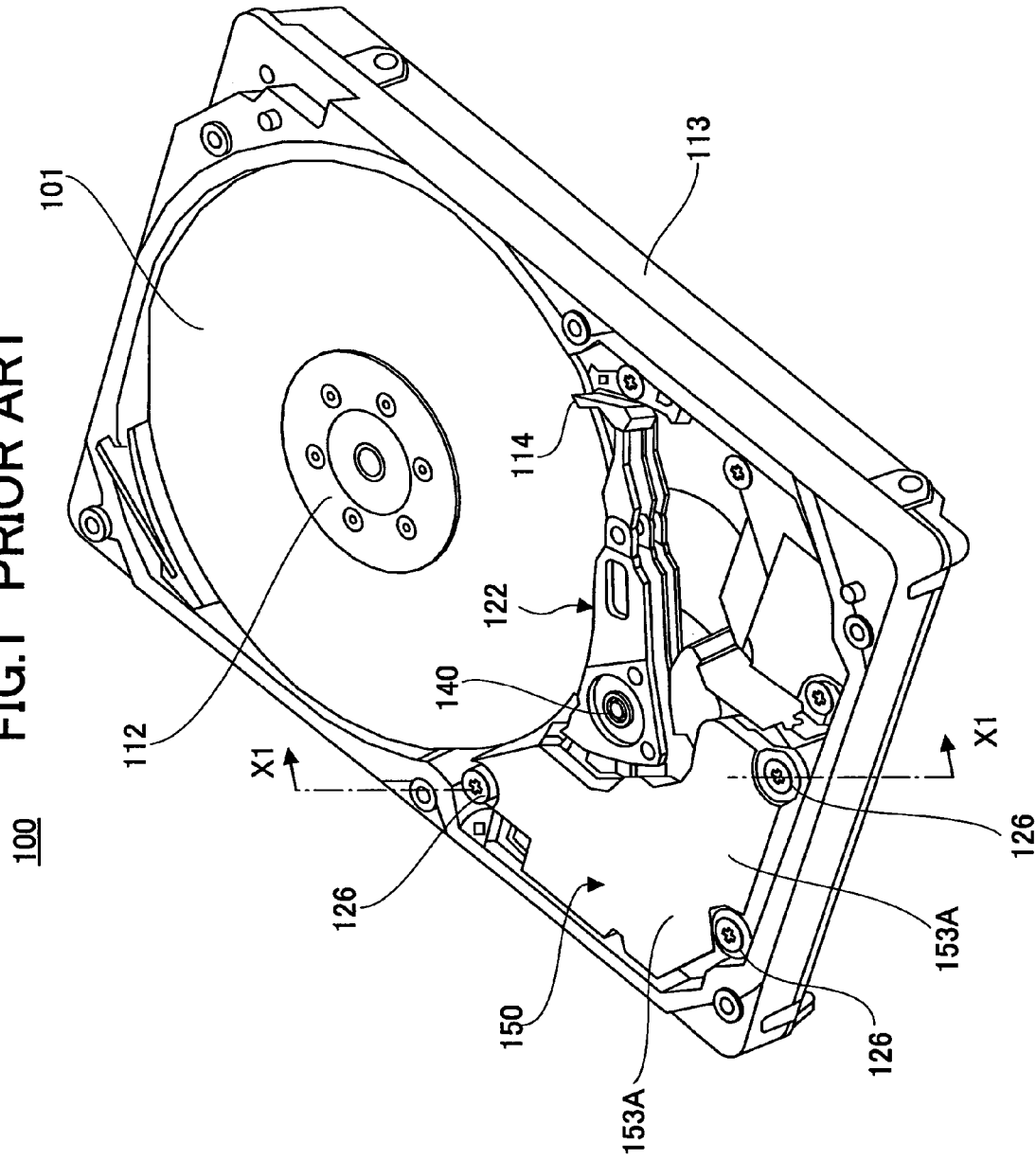
FIG. 1 is a perspective view of a conventional magnetic disk device.
Figure 2:
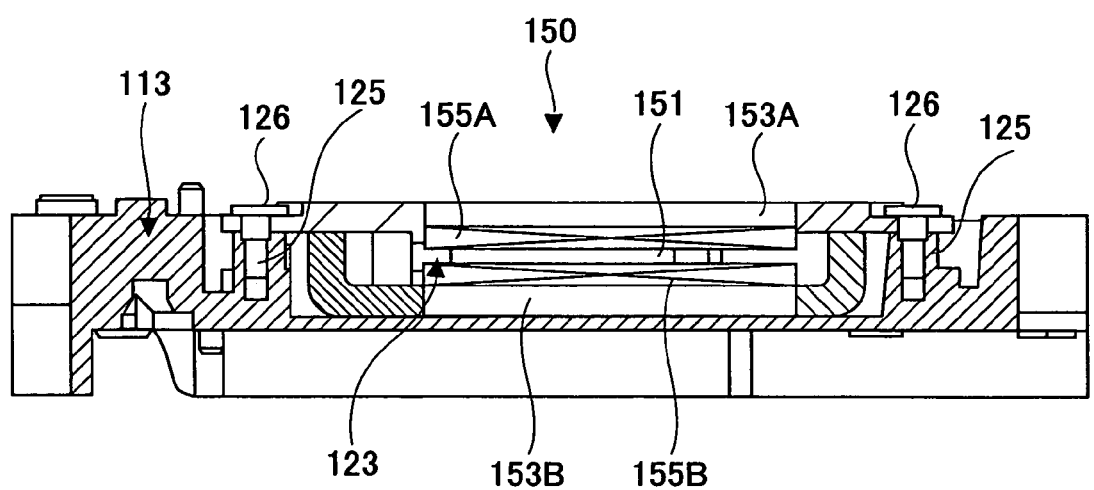
FIG. 2 is a cross-sectional view of the conventional magnetic disk device taken along the line X1-X1 line indicated in FIG. 1.
Figure 3:
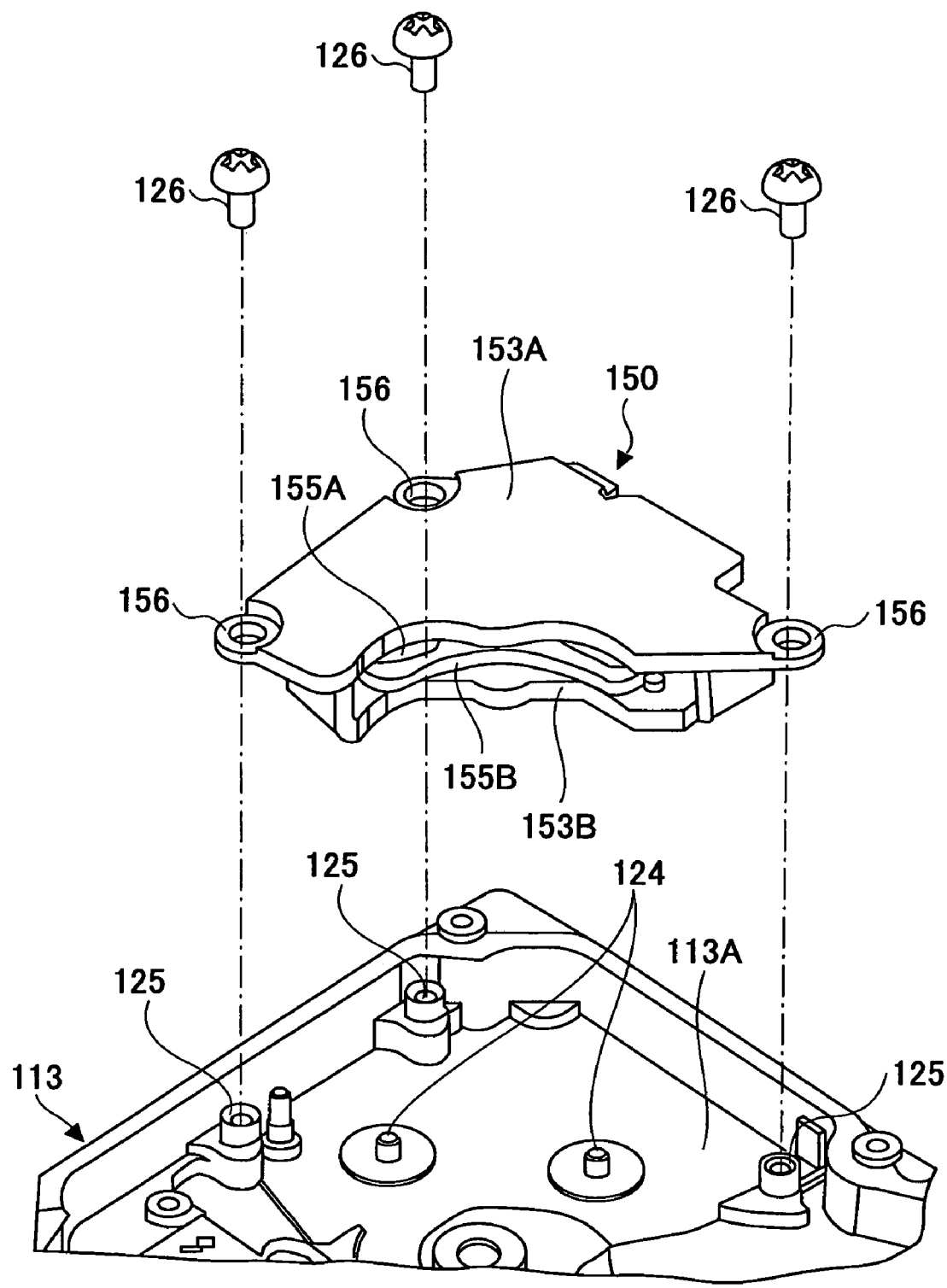
FIG. 3 is a perspective view showing the mounting structure of a magnetic circuit in the conventional magnetic disk device.
Figure 4:
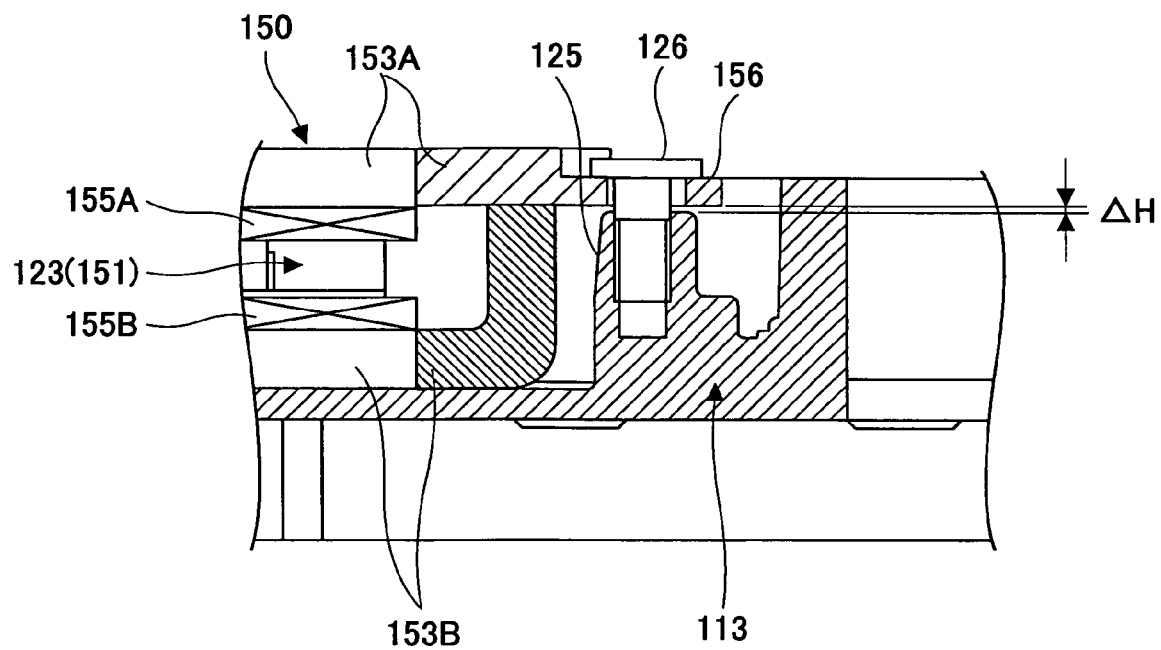
FIG. 4 is an enlarged cross-sectional view showing the neighborhood portion of a screw in the state where a magnetic circuit is fixed to a base in the conventional magnetic disk device.
Figure 5:
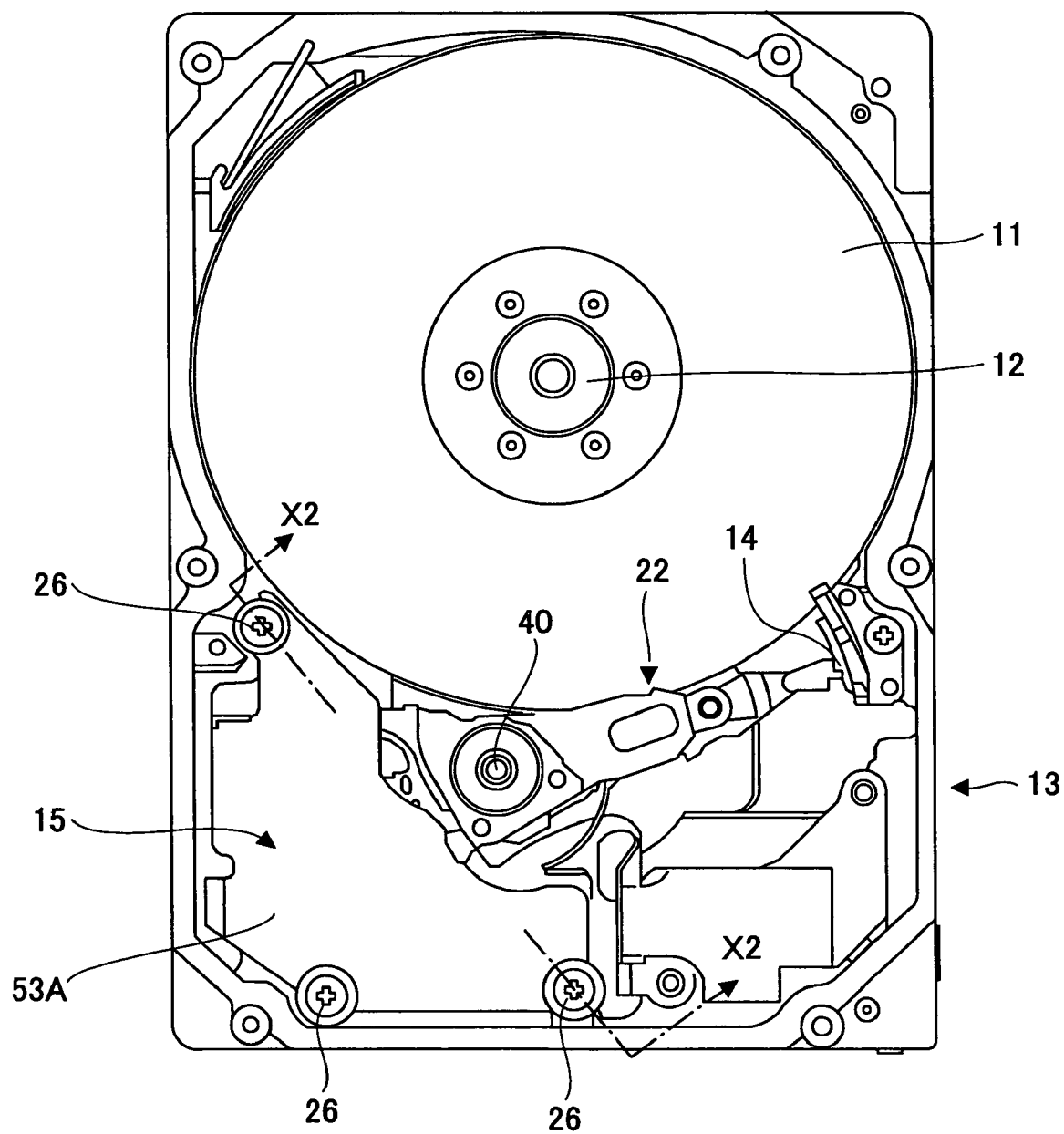
FIG. 5 is a plan view of a magnetic disk device in an embodiment of the invention.
Figure 6:
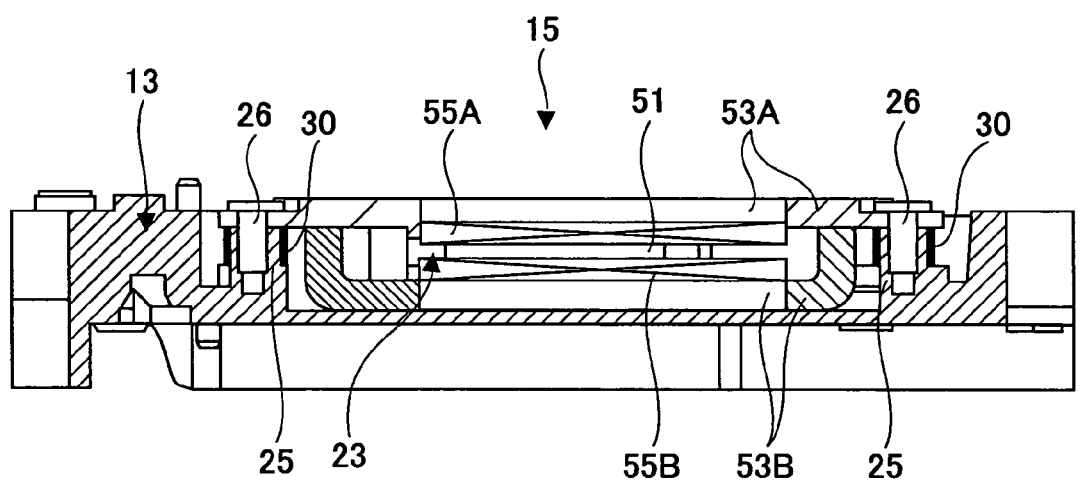
FIG. 6 is a cross-sectional view of the magnetic disk device taken along the line X2-X2 indicated in FIG. 5.
Figure 7:
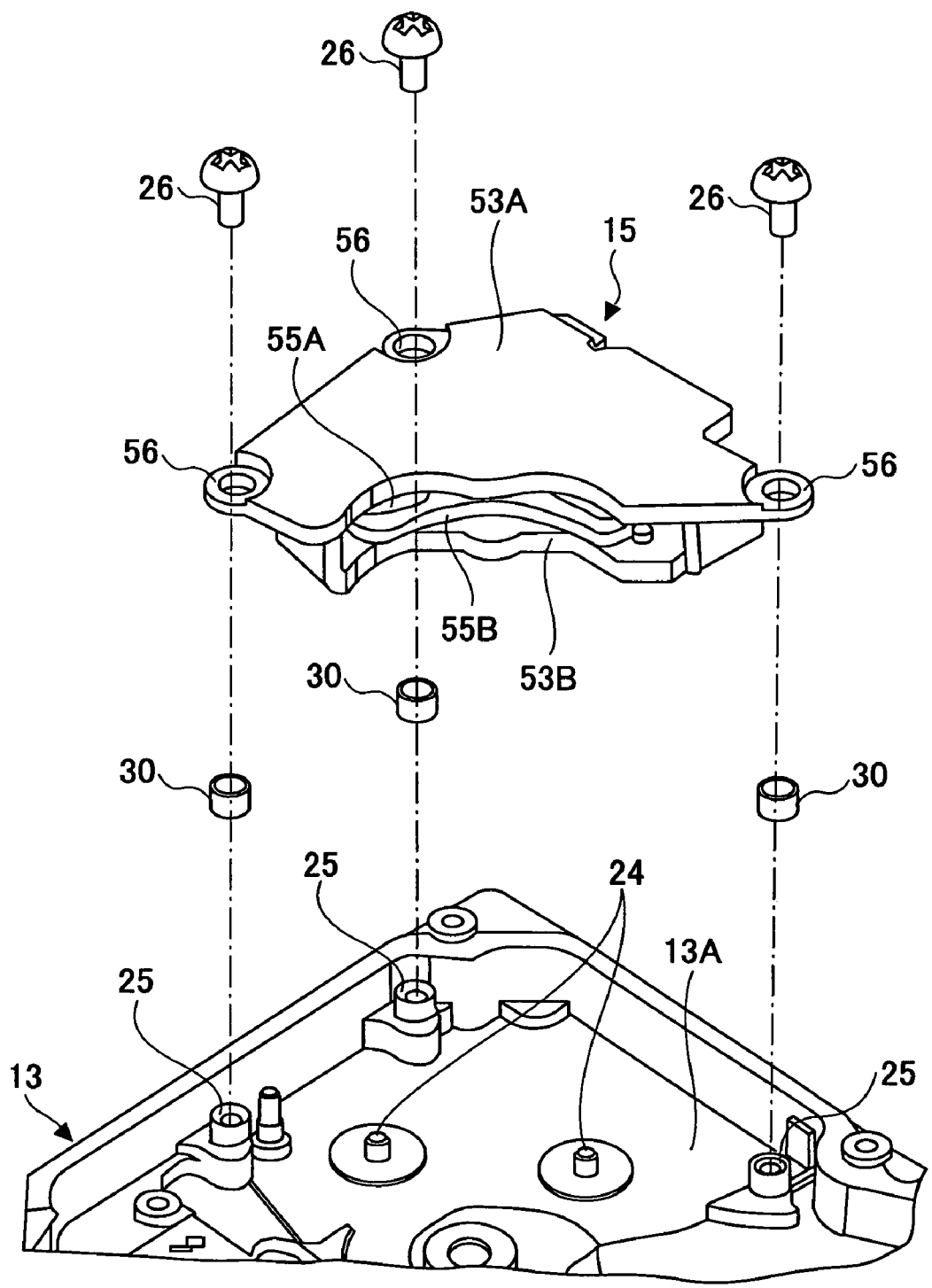
FIG. 7 is a perspective view showing the mounting structure of a magnetic circuit in the disk device in the embodiment of the invention.
Figure 8:
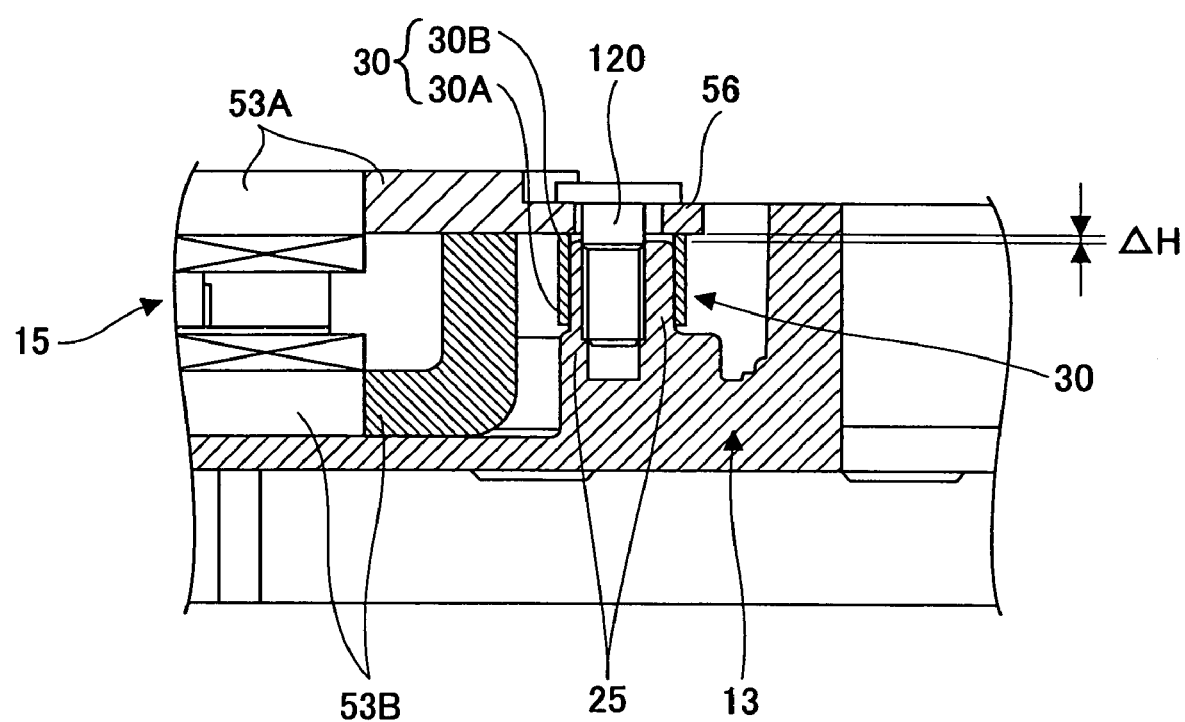
FIG. 8 is an enlarged cross-sectional view showing the neighborhood portion of a screw in the state where the magnetic circuit is fixed to the base in the magnetic disk device in the embodiment of the invention.

FIG. 5 is a perspective view showing magnetic disk device 10 in the embodiment of the invention, and FIG. 6 is a cross-sectional view of the magnetic disk device 10 taken along the line X2-X2 indicated in FIG. 5. FIG. 7 is a perspective view showing the mounting structure of a magnetic circuit 15 (described later) in the magnetic disk device 10, and FIG. 8 is an enlarged cross-sectional view showing the neighborhood portion of a screw 26 in the state where the magnetic circuit 15 is fixed to a base 13.

As shown in FIG. 5 through FIG. 8, the magnetic disk device 10 comprises a magnetic disk 11, a spindle motor 12, an actuator 22, and a voice coil motor (VCM) 23, and these components are accommodated in the enclosure including a cover (its illustration being omitted) and the base 13. The magnetic disk 11 is a data recording medium. The spindle motor 12 is provided to rotate the magnetic disk 11. In the actuator 22, a head slider 14 on which a magnetic head is mounted is implemented. The voice coil motor (VCM) 23 drives the actuator 22 so that the actuator 22 is swung around a shaft 40.

The magnetic disk 11 is fixed to the rotor part of the spindle motor 12. The magnetic disk 11 is rotated by the spindle motor 12 at the time of operation of the magnetic disk device 10 (or at the time of recording/reproducing processing). The rotation of the magnetic disk 11 is stopped in the non-operating state of the magnetic disk device 10.

The actuator 22 is rotatably supported on the shaft 40 provided on the base 13, such that the actuator 22 can be swung around the shaft 40. This actuator 22 includes a support arm and a coil arm. The head slider 14 is disposed on the front end part of the support arm of the actuator 22 through a support spring.

The head slider 14 is disposed so that the head slider 14 faces the magnetic disk 11. The head slider 14 is provided with the magnetic head (not shown), and the magnetic head is provided to write the data from the control part (not shown) to a track on the surface of the magnetic disk 11, and provided to read the data from the track of the magnetic disk 11 and transfer the read data to the control part. This head slider 14 is provided so that the head slider 14 is lifted over the surface of the rotating magnetic disk 11 when the magnetic disk device 10 is in the operating state.

Moreover, the voice coil 51 is disposed at the rear-end part of the coil arm of the actuator 22. This voice coil 51 is associated with the magnetic circuit 15 and constitutes the voice coil motor 23. The magnetic circuit 15 is provided to drive the actuator 22 so that the actuator 22 is swung around the center of the shaft 40 and the magnetic head carried on the actuator 22 is moved to a target track on the surface of the magnetic disk 11.

The magnetic circuit 15 is constituted by the upper yoke 53A, the lower yoke 53B, the upper magnet 55A, and the lower magnet 55B. As shown in FIG. 6 and FIG. 7, the upper magnet 55A is disposed on the bottom surface of the upper yoke 53A, and the lower magnet 55B is disposed on the top surface of the lower yoke 53B.

A gap is formed between the upper magnet 55A and the lower magnet 55B, and the voice coil 51 of the actuator 22 is movably disposed in this gap. The voice coil motor 23 (VCM) is constituted by the voice coil 51, the upper yoke 53A, the lower yoke 53B, the upper magnet 55A, and the lower magnet 55B.

In this embodiment, it is supposed that the upper and lower yokes 53A and 53B and the upper and lower magnets 55A and 55B, excluding the voice coil 51 among the components of the voice coil motor 23, constitute the magnetic circuit 15.

As previously described, it is necessary to position the head slider 14 (magnetic head) at a given location on the magnetic disk 11 with high precision, in order for the magnetic disk device 10 to perform proper magnetic recording/reproducing processing.

For this reason, the actuator 22 and the shaft 40 which supports the actuator 22 are disposed on the base 13 with high precision. Under the present circumstances, in order to keep an appropriate state of the head slider 14 (magnetic head) and the magnetic disk 11 at the time of recording/reproducing processing, accurate positioning of the actuator 22 and the shaft 40 in the height direction on the base 13 is important as previously described.

Moreover, the voice coil 51 of the actuator 22 which is disposed with high precision is inserted in the magnetic circuit 15, and it is also necessary to raise the accuracy of positioning of the magnetic circuit 15 in the height direction on the base 13.

For this reason, as shown in FIG. 7, a reference-height projection 24 is formed in the bottom plate 13A of the base 13, and the magnetic circuit 15 is placed on this reference-height projection 24, so that the height arrangement of the magnetic circuit 15 on the base 13 is thereby determined.

The reference-height projection 24 is formed with high precision, and placing the magnetic circuit 15 on the reference-height projection 24 enables good height accuracy to be attained.

Moreover, to fix the magnetic circuit 15 to the base 13, screws 26 are used as shown in FIG. 7. The threaded-hole parts 25 in which the threaded holes are formed are provided in the base 13 so that the screws 26 are fastened to the threaded-hole parts 25. The threaded-hole parts 25 are arranged in a column formation which projects from the bottom plate 13A of the base 13. In addition, the magnetic circuit 15 is provided with washer parts 56, and each washer part 56 has a through hole which passes through the screw 26 being inserted.

Therefore, the magnetic circuit 50 is fixed to the base 13 by inserting the screws 26 in the through holes of the washer parts 56 and fastening the screws 26 to the threaded-hole parts 25. Under the present circumstances, in this embodiment, the magnetic circuit 15 is placed on the reference-height projection 24, and thereby the height accuracy of the actuator 22 and the magnetic circuit 15 to the base 13 is determined with high precision. Thus, it is possible to keep an appropriate state of the head slider 14 (magnetic head) and the magnetic disk 11 at the time of recording/reproducing.

Moreover, the magnetic disk device 10 in this embodiment comprises blocking members 30 which are provided between the washer parts 56 and the threaded-hole parts 25 respectively (see FIG. 7 and FIG. 8).

The blocking members 30 are made of an elastic material, such as a rubber or a resin. The blocking members 30 are arranged in a tubular formation. The inside diameter of the blocking members 30 is set up so that it is slightly smaller than the outside diameter of the threaded-hole parts 25.

Before the magnetic circuit 15 is attached to the base 13, the blocking members 30 of the tubular formation are attached to the threaded-hole parts 25.

The threaded-hole parts 25 are arranged in a column formation which projects from the bottom plate 13A of the base 13, and the blocking members 30 are arranged in a tubular formation. Thus, attaching the blocking members 30 to the threaded-hole parts 25 can be performed easily.

Moreover, the blocking members 30 are made of an elastic material, such as a rubber or a resin, and have the tubular formation, and they can be obtained with low cost. For this reason, even if the magnetic disk device 10 is equipped with the blocking members 30, the cost of the magnetic disk device 10 does not become excessively high.

After the blocking members 30 are attached to the threaded-hole parts 25, the upper parts of the blocking members 30 upwardly project by a predetermined height on the upper end of the threaded-hole parts 25.

In the following description, in the state where each blocking member is attached to the threaded-hole part 25, a portion of the blocking member 30 currently fixed onto the threaded-hole part 25 is called a fixed portion 30A, and the remaining portion of the blocking member 30 which is projecting from the upper end of the threaded-hole part 25 is called a projecting portion 30B (refer to FIG. 8).

By the way, when the mounting structure in which the magnetic circuit 15 is mounted on the reference-height projection 24 to raise the height accuracy of the mounting structure as described above, it is difficult to firmly fix the magnetic circuit 15 to the threaded-hole parts 25. In order to prevent the reference-height projection 24 from being crushed, it is necessary to provide a gap ΔH between the upper surface of the threaded-hole part 25 and the washer part 56. In FIG. 8, ΔH indicates this gap.

In the conventional magnetic disk device, there is a possibility that the dust from the threaded-hole part 125 may be scattered inside the magnetic disk device, because of the use of the gap ΔH. Such dust may cause a head crush to take place.

However, according to this embodiment, the blocking members 30 are attached to the threaded-hole parts 25, and the projecting portions 30B of the blocking members 30 upwardly project from the upper ends of the threaded-hole parts 25.

Moreover, the projection height of each projecting portion 30B is set up so that it is larger than the height of the above-mentioned gap ΔH. Therefore, when the magnetic circuit 15 is fastened to the threaded-hole parts 25 by the screws 26, the projecting portions 30B of the blocking members 30 contact the washer parts 56, and the gap ΔH formed between the magnetic circuit 15 and the threaded-hole parts 25 is enclosed by the blocking members 30 (or specifically by the projecting portions 30B of the blocking members 30).

Under the present circumstances, the projecting portions 30B contact the washer parts 56 with an elastic force, and the fitting of the blocking members 30 and the washer parts 56 can be maintained with high airtightness.

Accordingly, even if dust occurs from the threaded-hole parts 25 when attaching the screws 26 to the threaded-hole parts 25 or detaching the screws 26 from the threaded-hole parts 25, such dust does not lead out from the exterior of the blocking members 30.

The dust from the threaded-hole parts 25 does not adhere to the space between the magnetic head and the magnetic disk 11, and it is possible to prevent occurrence of a head crush. Therefore, the reliability of the magnetic disk device 10 can be increased.

In the above-mentioned embodiment, the tubular-form rubber parts are used as the blocking members 30. However, the blocking members 30 are not limited to the tubular-form rubber parts. For example, it is also possible to use packing parts made of an elastic material as the blocking members 30.

Moreover, in the above-mentioned embodiment, the head parts of the screws 26 contact the washer parts 56 directly. Alternatively, in order to prevent the scattering of the dust into the magnetic disk device more certainly, packing materials may be provided between the head parts of the screws 26 and the washer parts 56, which prevent the scattering of dust inside the magnetic disk device 10, by using the through holes of the washer parts 56.

The present invention is not limited to the above-described embodiment, and variations and modifications may be made without departing from the scope of the present invention.

What is claimed is:

1. A magnetic disk device comprising:
    a magnetic circuit including a lower yoke and an upper yoke, the upper yoke having a washer part formed in an outer area of the upper yoke and driving an actuator carrying a magnetic head, so that the magnetic head is moved to a target track on a surface of a magnetic disk;
    a base mounting a spindle motor which rotates the magnetic disk and having a threaded-hole part opposing the washer part;
    a screw being inserted to the washer part and the threaded-hole part and fastening the upper yoke to the base; and
    a blocking member arranged between the washer part and the threaded-hole part, the blocking member enclosing a gap outside the lower yoke between a bottom surface of the washer part and a top surface of the threaded-hole part,
    wherein the threaded-hole part is internally arranged in a column formation projection from a bottom plate of the base, and an inside surface of the blocking member is fitted in contact with an outside surface of the column formation of the base.

2. The magnetic disk device according to claim 1 wherein the blocking member is a tubular member which is made of an elastic material.

3. The magnetic disk device according to claim 2 wherein the tubular member comprises a fixed portion fixed onto the threaded-hole part, and a projecting portion upwardly projecting from the threaded-hole part and contacting the magnetic circuit with an elastic deformation.

4. The magnetic disk device according to claim 2 wherein the tubular member is made of an elastic material which is either a rubber or a resin.

5. The magnetic disk device according to claim 1 wherein a reference-height projection is formed on the base, and the magnetic circuit is placed on the reference-height projection so that positioning of the magnetic circuit in a height direction on the bottom plate of the base is performed.

6. The magnetic disk device according to claim 1 wherein the blocking member is a packing member which is made of an elastic material.

7. The magnetic disk device according to claim 1 wherein an inner diameter of the blocking member is smaller than an outer diameter of the column formation.

* * * * *